No. 839,368. PATENTED DEC. 25, 1906.
J. T. DEMPSTER.
SPRING SUPPORT FOR MEASURING INSTRUMENTS.
APPLICATION FILED SEPT. 26, 1903.
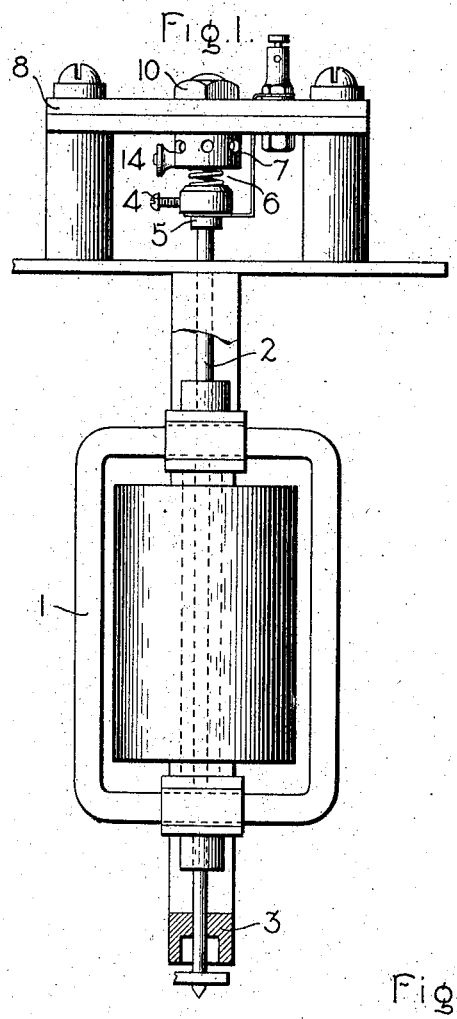
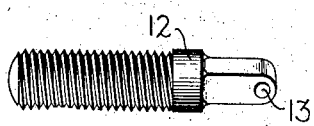
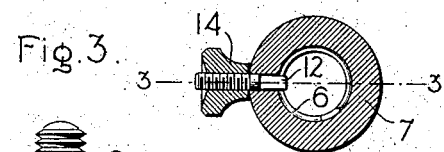
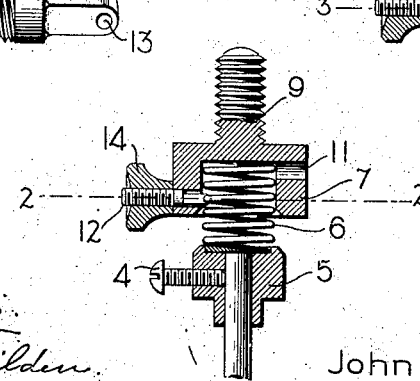
Witnesses
Harry H. Tilden
Helen Orford
Inventor.
John T. Dempster.
by Albert G. Davis
Att'y.

UNITED STATES PATENT OFFICE.

JOHN THOS. DEMPSTER, OF SCHENECTADY, NEW YORK, ASSIGNOR TO GENERAL ELECTRIC COMPANY, A CORPORATION OF NEW YORK.

SPRING-SUPPORT FOR MEASURING INSTRUMENTS.

No. 839,368.              Specification of Letters Patent.         Patented Dec. 25, 1906.

Application filed September 26, 1903. Serial No. 174,694.

*To all whom it may concern:*

Be it known that I, JOHN THOS. DEMPSTER, a subject of the King of Great Britain, residing at Schenectady, in the county of Schenectady, State of New York, have invented certain new and useful Improvements in Spring-Supports for Measuring Instruments, of which the following is a specification.

This invention relates to measuring instruments in which there is a rotatable element combined with means for exerting thereon a zero-seeking torque, such as a torsion-spring.

The object of my invention is to provide for such an element a suspending torsion-spring capable of ready adjustment. As an example of such an instrument may be cited an electrical voltmeter or ammeter, in which the varying voltage or current angularly displaces a rotatable armature from a normal position against the tension of a zero-seeking spring. Such springs are frequently soldered fast at each end, so that if they get out of adjustment they must be broken loose and resoldered.

My invention provides a simple and inexpensive fastening device by means of which the spring can be quickly and delicately adjusted.

To this end the invention consists in a holder receiving one end of the spring and a clamp coöperating with the wall of said holder at a given point and serving to hold the spring rigidly when tightened, but releasing it when loosened, so that the spring can be shifted to a new adjustment.

In the accompanying drawings, Figure 1 is an elevation of a portion of an electrical measuring instrument embodying my invention. Fig. 2 is a cross-section, on a larger scale than Fig. 1, taken on the line 2 2 of Fig. 3. Fig. 3 is a longitudinal section on the line 3 3, Fig. 2; and Fig. 4 is an enlarged view of the clamp-rod.

The rotatable element of the instrument is represented in the drawings by the coil 1, inclosing a fixed iron core, as shown. The coil is mounted on an upright shaft 2 and connected in circuit in any suitable manner, as by flexible conductors 15, leading to binding-posts, as shown. The lower end of the shaft is guided in a cylindrical bearing 3, while its upper end is secured by a set-screw 4 in a collar 5. To the upper end of the collar is attached, by solder or otherwise, a helical spring 6, which acts as a support and also furnishes the zero-seeking torque.

The upper end of the spring is received by a holder, preferably a socket 7, suitably fastened to a stationary support, such as the bridge 8, forming part of the frame of the instrument. For this purpose the socket may have a central screw-threaded shank 9 passing up through a hole in the bridge and meshing with a nut 10. Holes 11 in the socket admit a pin for turning it to just the right position.

A suitable clamp is provided for the spring, consisting, preferably, of a clamp-bar 12, passing through a radial hole in the wall of the socket and having in its inner end a transverse hole 13, through which the spring is threaded. The shank of the bar projects beyond the outside of the socket and is screw-threaded to receive a thumb-nut 14.

When it is desired to adjust the tension of the spring, the nut 14 is backed off, thereby loosening the clamp-bar and permitting the spring to be turned in the socket, screwing through the hole 13 in the bar. When the spring has been angularly adjusted to the proper position, the nut 14 is tightened, drawing the clamp-bar outwardly and causing it to clamp the spring rigidly against the wall of the socket. The angular adjustment of the shaft 2 is accomplished by loosening the set-screw 4, rotating the shaft by hand in the collar 5, and then setting up the screw.

In accordance with the patent statutes I have described the principle of operation of my invention, together with the apparatus which I now consider to represent the best embodiment thereof; but I desire to have it understood that the apparatus shown is only illustrative and that the invention can be carried out by other means.

What I claim as new, and desire to secure by Letters Patent of the United States, is—

1. In an electric measuring instrument, a rotatable shaft, a coil carried thereby, means for connecting said coil in circuit, a helical spring secured at one end to the shaft for yieldingly suspending the same and relieving the bearings of the weight of the moving element and furnishing the zero-seeking force, a holder for the spring, means permitting adjustment of the spring in the holder to vary its active length, and means for locking the spring in any adjusted position.

2. The combination with a rotatable element, of a torsion-spring for yieldingly suspending the same and relieving the bearings of the weight of the moving element, a socket receiving one end of said spring, and means for clamping said spring against the wall of said socket.

3. The combination with a rotatable element, of a torsion suspending-spring for the same, a socket receiving one end of said spring, and a radially-movable clamp-bar engaging with said spring.

4. The combination with a rotatable element, of a torsion suspending-spring for the same, a socket receiving one end of said spring, and a radially-movable clamp-bar having a transverse hole through which said spring is threaded.

5. The combination with a rotatable element, of a torsion suspending-spring for the same, a socket receiving one end of said spring, and a radially-movable clamp-bar engaging with said spring, and having a screw-threaded shank provided with a thumb-nut.

In witness whereof I have hereunto set my hand this 24th day of September, 1903.

JOHN THOS. DEMPSTER.

Witnesses:
G. C. HOLLISTER,
HELEN ORFORD.